(12) United States Patent
Sandberg et al.

(10) Patent No.: US 11,499,501 B2
(45) Date of Patent: Nov. 15, 2022

(54) STIRLING ENGINE DESIGN AND ASSEMBLY

(71) Applicant: AZELIO AB, Gothenburg (SE)

(72) Inventors: Håkan Sandberg, Åmål (SE); Martin Nilsson, Gothenburg (SE)

(73) Assignee: AZELIO AB, Åmål (SE)

( * ) Notice: Subject to any disclaimer, the term of this patent is extended or adjusted under 35 U.S.C. 154(b) by 0 days.

(21) Appl. No.: 17/425,846

(22) PCT Filed: Jan. 29, 2020

(86) PCT No.: PCT/SE2020/050074
§ 371 (c)(1),
(2) Date: Jul. 26, 2021

(87) PCT Pub. No.: WO2020/159424
PCT Pub. Date: Aug. 6, 2020

(65) Prior Publication Data
US 2022/0120235 A1    Apr. 21, 2022

(30) Foreign Application Priority Data

Jan. 29, 2019  (SE) .................................... 1950104-8

(51) Int. Cl.
*F02G 1/044*  (2006.01)
*F02G 1/043*  (2006.01)
*F02G 1/057*  (2006.01)

(52) U.S. Cl.
CPC ............. *F02G 1/044* (2013.01); *F02G 1/043* (2013.01); *F02G 1/057* (2013.01)

(58) Field of Classification Search
CPC ........... F02G 1/044; F02G 1/043; F02G 1/057
(Continued)

(56) References Cited

U.S. PATENT DOCUMENTS 3,397,533 A   8/1968 Steiner et al.
3,699,770 A   10/1972 Bennethum
(Continued)

OTHER PUBLICATIONS

International Search Report, issued in PCT/SE2020/050074, dated Apr. 29, 2020.
(Continued)

*Primary Examiner* — Hoang M Nguyen
(74) *Attorney, Agent, or Firm* — Birch, Stewart, Kolasch & Birch, LLP

(57) ABSTRACT

A method for pressurisation of a working gas in a Stirling engine assembly for use in a thermal energy plant, the Stirling engine assembly including: a Stirling engine including an expansion cylinder and a compression cylinder, wherein the expansion and compression cylinders are configured in a V-arrangement; a regenerator; a cooler and a heater; an accumulator, the accumulator being in fluidic connection with the expansion and/or compression cylinders of the Stirling engine; and a low pressure receptacle including the working gas. The method includes: providing working gas to the accumulator from the low pressure receptacle; providing a pressurisation fluid to the accumulator to reduce the volume for the working gas in the accumulator, thereby increasing the pressure of the working gas in the accumulator; and displacing the pressurised working gas from the accumulator to the expansion and/or compression cylinder.

19 Claims, 2 Drawing Sheets

(58) Field of Classification Search
USPC .................................................. 60/517–526
See application file for complete search history.

(56) References Cited

U.S. PATENT DOCUMENTS

| | | | | |
|---|---|---|---|---|
| 4,416,114 A | * | 11/1983 | Martini | ................... F02G 1/043 |
| | | | | 60/517 |
| 4,824,149 A | * | 4/1989 | Reuchlein | .............. H02K 35/02 |
| | | | | 290/1 R |
| 6,470,679 B1 | * | 10/2002 | Ertle | ......................... F02G 1/02 |
| | | | | 60/512 |
| 7,171,810 B2 | * | 2/2007 | Conrad | ................ F02G 1/0435 |
| | | | | 60/520 |
| 2006/0207249 A1 | * | 9/2006 | Yaguchi | ................... F02B 75/32 |
| | | | | 60/520 |
| 2016/0348661 A1 | | 12/2016 | Tognarelli et al. | |

OTHER PUBLICATIONS

Written Opinion of the International Searching Authority, issued in PCT/SE2020/050074, dated Apr. 29, 2020.

\* cited by examiner

STIRLING ENGINE DESIGN AND ASSEMBLY

FIELD OF THE INVENTION

The present disclosure relates to Stirling engines for use in solar thermal power plants. In particular it relates to Stirling engines having an accumulator for pressurisation of the working gas.

BACKGROUND OF THE INVENTION

Solar thermal power plants convert solar radiation from the sun in to thermal energy which can be converted in to electrical energy.

Some systems use Stirling engines as a generator to generate electrical energy from the solar thermal energy. Stirling engines are external, closed-cycle engines which use an external heat source to expand a working gas which drives one or more pistons.

An alpha arranged Stirling engine has two separate cylinders, which may be inline, parallel or in a V-arrangement.

The efficiency of Stirling engines depends on many factors such as the type of engine, the working gas used in the engine and the efficiency of the various components within the Stirling engine such as the regenerator.

The total energy efficiency of solar thermal power system comprising a Stirling engine is also dependent on the energy consumption used during start-up processes, such as during pressurization of the working gas. Efficient pressurization techniques are required which improve the total energy efficiency of the Stirling engine, during both operation and start-up.

SUMMARY OF THE INVENTION

Accordingly, the present invention preferably seeks to mitigate, alleviate or eliminate one or more of the above-identified deficiencies in the art and disadvantages singly or in any combination and solves at least the above mentioned problems by providing a method for pressurisation of a working gas in a Stirling engine assembly for use in a solar thermal energy plant, the Stirling engine assembly comprising: a Stirling engine comprising an expansion cylinder and a compression cylinder, wherein the expansion and compression cylinders are configured in a V-arrangement, the Stirling engine assembly further comprising a regenerator, a cooler and a heater and an accumulator, said accumulator being in fluidic connection with the expansion and/or compression cylinders of the Stirling engine, the Stirling engine assembly further comprising a low pressure receptacle comprising the working gas, the method comprising: providing working gas to the accumulator from the low pressure receptacle, providing a pressurisation fluid to the accumulator to reduce the volume for the working gas in the accumulator, thereby increasing the pressure of the working gas in the accumulator, and displacing the pressurised working gas from the accumulator to the expansion and/or compression cylinder.

A Stirling engine assembly is also provided.

Further advantageous embodiments are disclosed in the appended and dependent patent claims.

BRIEF DESCRIPTION OF THE DRAWINGS

These and other aspects, features and advantages of which the invention is capable will be apparent and elucidated from the following description of embodiments of the present invention, reference being made to the accompanying drawings, in which.

DETAILED DESCRIPTION

Figure 1:
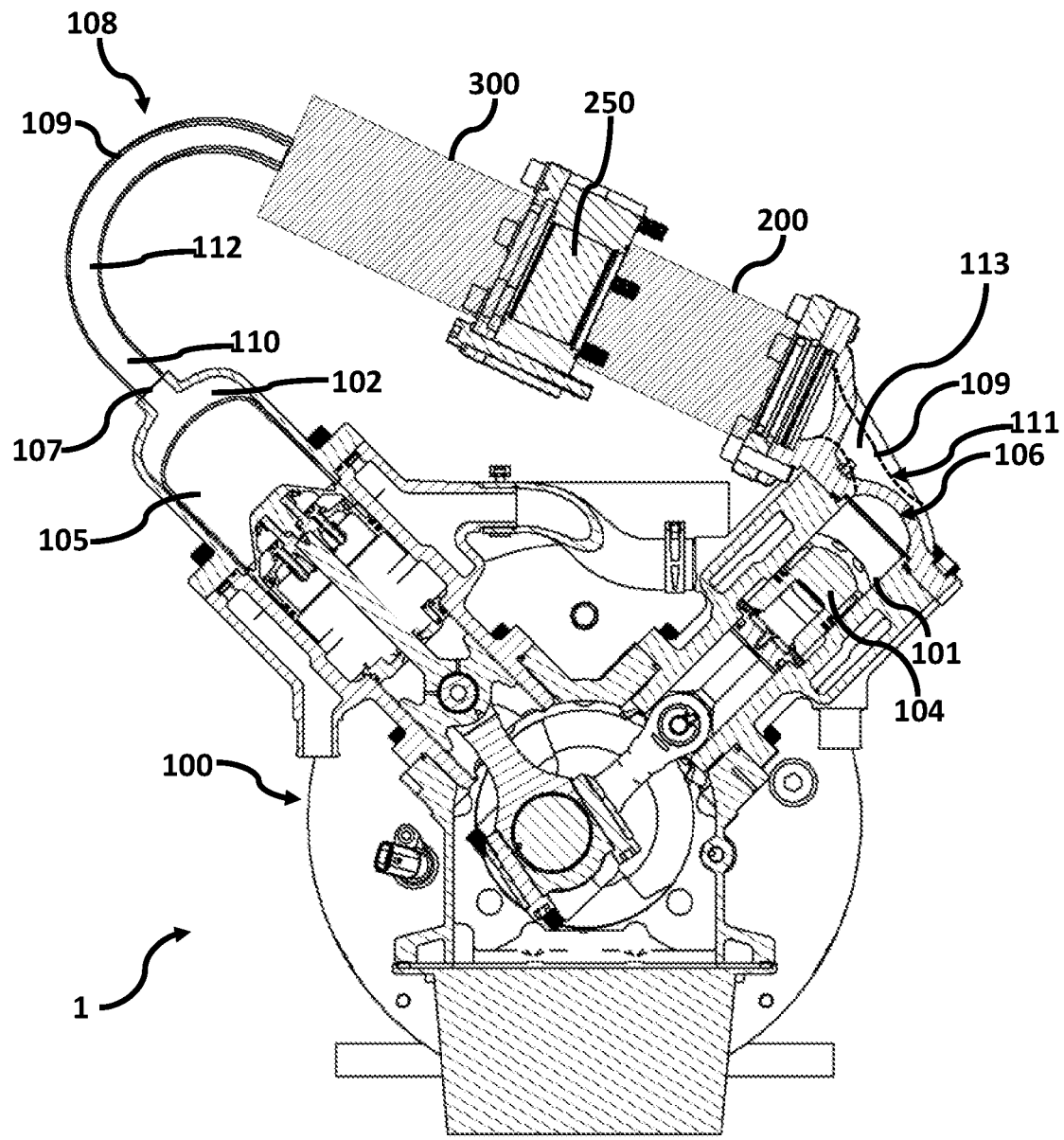
FIG. 1 is a cross-sectional perspective view of a Stirling engine assembly according to an aspect.
Figure 2:
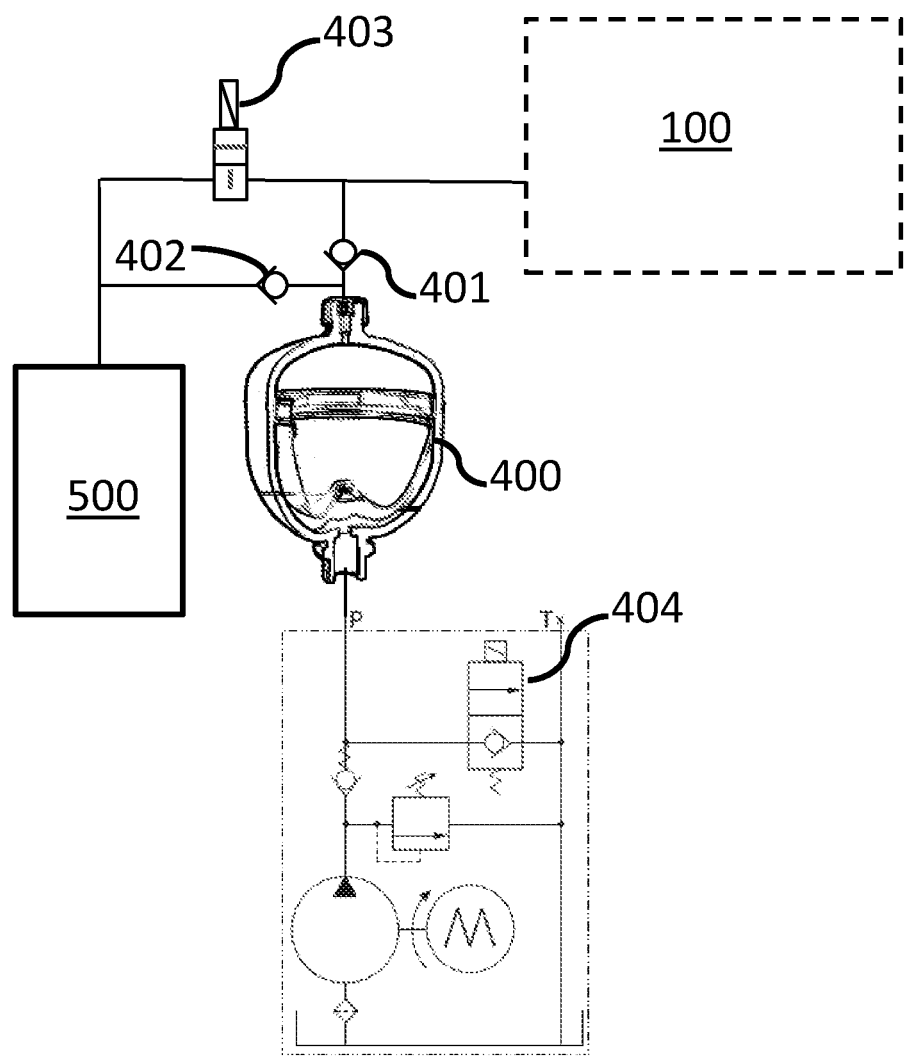
FIG. 2 is a partial schematic of a Stirling engine assembly according to an aspect.

FIG. 1 shows a Stirling engine 100 comprising a compression cylinder 101 and an expansion cylinder 102 in an alpha-/V-arrangement. The Stirling engine 100 comprises a crankcase which houses a rotatable crankshaft. Each of the compression 101 and expansion cylinders 102 house a piston 104,105. The expansion and compression cylinders 101, 102 are connected to each other at their respective upper portions 106, 107 for the transfer of a working gas. A regenerator 250 is provided between the expansion 102 and compression 101 cylinders. The regenerator 250 is on the fluidic path 108 for the working gas between the expansion 102 and compression 101 cylinders. A heater 300 is provided between the expansion 102 and the compression 101 cylinders. The heater 300 is arranged on the fluidic path 108 for the working gas between the expansion 102 cylinder and the compression 101 cylinder. The heater 300 is generally arranged between the expansion cylinder 102 and the regenerator 250. The expansion cylinder 102 may be considered the hot cylinder 102. The compression cylinder 101 may be considered the cold cylinder 101.

A gas cooler 200 is provided on the fluidic path 108 for the working gas between the expansion 102 and compression 101 cylinders. The gas cooler 200 is arranged between the compression cylinder 101 and the regenerator 250. The regenerator 250 is provided between the heater 300 and the gas cooler 200.

The fluidic path 108 between the expansion and the compression cylinders 102, 101 is formed partially by a pipe 109 comprising a first end 110 proximal the expansion cylinder 102, and a second end 111 proximal the compression cylinder 101. The fluidic path 108 also comprises the heater 300 and the regenerator 250.

In theoretical models of Stirling engines total dead volume is generally considered the total unswept volume. In physical Stirling engine assemblies the regenerator and the heater have a physical size which cannot be reduced to zero, and therefore a more relevant dead volume is the volume of the fluidic path between the expansion and compression cylinders not formed by the heater and the regenerator. That is, the total volume of the fluidic path between the swept volumes of the cylinders, minus the volume of the heater and the regenerator. It is generally accepted that dead volume should be reduced to improve efficiency of the Stirling engine. However, physical constraints due to the size of each of the heater and the regenerator and the V-arrangement of the cylinders leads to some dead volume always being present in the fluidic path. As can be seen in FIG. 1. the cylinders extend at an angle from each other and the regenerator and the heater are substantially straight components, therefore, a length of connecting members are required to connect the fluidic path between the expansion and compression cylinders. A first connecting member 112 connects the heater 300 to the expansion cylinder 102. A second connecting member 113 connects the cooler 200 to the compression cylinder 101. Both the first 112 and second 113 connecting members have a non-zero length. The volume of these connecting members 112, 113 forms the dead volume as referred to in this Stirling engine system. The second connecting member 113 is shown via the dashed lines in FIG. 1 as it is partially not-visible in the cross-sectional view.

Generally dead volumes in Stirling engine systems have been avoided by reducing all unswept volumes. There are numerous methods of reducing dead volume, for example, reducing the length of all connecting members, reducing the diameter of all connecting members, reducing the diameter of some connecting members etc.

The present inventors have realized, however, that efficiency in the Stirling engine can be increased by reducing the length of the first connecting member 112, that is the connecting member between the cooler 200 and the compression cylinder 101 with respect to the length of the second connecting member 113, that is the connecting member between the heater 300 and the expansion cylinder 102.

The present Stirling engine therefore relates to a Stirling engine having a first connecting member 112 between the heater 300 and the expansion cylinder 102 which is longer than the second connecting member 113 between the cooler 200 and the compression cylinder 101.

To achieve an efficient working cycle the inventors have identified that in addition to minimising the volume of all connecting members, the volume of the second connecting member 113 should be minimized, such that it is less than the volume of the first connecting member 112. The internal diameter of the second connecting member 113 may be non-uniform. The internal diameter of the second connecting member 113 may converge from a region proximal the cooler 200 to a region of reduced diameter, and diverge from the region of reduced diameter to a region proximal the compression cylinder 101. The internal diameter of the region of reduced diameter of the second connecting member 113 may be less than the internal diameter of the first connecting member 112, to further reduce the volume of the second connecting member 113 with respect to the volume of the first connecting member 112. The diameter of the first connecting member 112 is ideally uniform to reduce pressure differentials and flow rate changes across the fluidic path.

The mass of working gas in the first and second connecting members 112, 113 may be substantially equal during operation. To maintain the equal mass, the lengths of the first and second connecting members 112, 113 may be configured such that the length of the second connecting member 113 is less than the length of the first connecting member 112.

The ratio of the length of the first connecting member 112 to the length of the second connecting member 113 has not heretofore been considered. Finkelstein (Finkelstein, Theodor, *European Stirling Forum*, March 1994) showed that the expansion and compression spaces may have a temperature dependent ratio, however, this related to the piston volumes themselves. It has not been described nor envisaged to date that the dead volumes may have an advantageous volumetric ratio dependent on the temperatures of the working gas.

The working gas may be any suitable gas such as air, hydrogen or helium. Generally helium is preferred as a working gas in lab and/or testing environments. Hydrogen is used in the field during, for example, energy generation.

The mean pressure in the cylinders 101, 102 is higher than ambient pressure. Mean pressure means the mean value of pressures throughout the duration of the working cycle of the cylinder. The mean pressure may be from about 30 bar to about 150 bar. During operation the mean pressure may be about 125 bar. The peak pressures reached during the duration of the working cycle in each cylinder may be from about 35% to about 40% higher than the mean pressure.

The regenerator 250 and the heater 300 may be directly connected to each other. That is, they may be connected without the presence of an additional conduit between the regenerator 250 and the heater 300.

The cooler 200 and the heater 300 may have internal cross-sections forming a path for the working gas which are substantially equal. That is, the internal diameter of the cooler 200 may be substantially equal to the internal diameter of the heater 300. The regenerator 250 has a flow path which is greater than the flow path in the heater 300 and the cooler 200. This is advantageous as flow velocity and static pressure through the cooler 200, regenerator 250 and the heater 300 may be maintained.

As stated the cylinders 101, 102 are configured in a V-arrangement. The working and compression cylinders may be arranged from about 85° to about 120°, such as about 90° to each other. The crank arms may be arranged at about 105° to each other.

The cylinders 101, 102 are offset longitudinally from each other. That is, they are offset along the length of the crankshaft.

As the cylinders 101, 102 are offset longitudinally the fluidic path between the upper portion of the compression 101 and the upper portion of the expansion cylinder 102, for the transfer of the working gas, is arranged at an acute angle with respect to the crankshaft.

The expansion cylinder 102 and the compression cylinder 101 may have different volumes. The expansion cylinder 102 may have a greater volume than the compression cylinder 101.

The Stirling engine assembly 1 may be considered a Stirling engine system 1. An accumulator 400 is provided in connection with the Stirling engine. The accumulator 400 is used to provide the working gas to the Stirling engine. The accumulator 400 may be a pressure vessel. The accumulator 400 may be configured to comprise a working gas and a different, pressurization fluid. The pressurization fluid is used to displace the working gas in to the Stirling engine. The accumulator 400 may comprise a diaphragm for separating the working gas from the pressurization fluid. The accumulator 400 may comprise a displaceable piston for separating the working gas from the pressurization fluid. The working gas and the pressurization fluid may be immiscible such that they do not mix and are separated. By using two immiscible fluids the diaphragm or piston may not be necessary.

The pressurization fluid may be an oil such as a hydraulic oil.

A low pressure receptacle 500 is provided in connection with the accumulator 400. The low pressure receptacle 500 may be provided in connection to the Stirling engine. The low pressure receptacle 500 stores the working gas at a pressure lower than the system start pressure of the Stirling engine.

The pressure of working gas in the low pressure receptacle is greater than about 15 bar, such as about 35 bar. That is, the system start pressure may be about 35 bar. The starting pressure of the working cycle is greater than the system start pressure.

On pressurization during start-up, the working gas is provided to the Stirling engine 100. The pressure of the working gas in the Stirling engine 100 must be increased to a suitable starting pressure. The pressurization of the working gas may be achieved by a single pressurization step, or by a plurality of pressurization steps.

Working gas is provided to the accumulator 400 from the low pressure receptacle 500. Pressurization fluid is provided to the accumulator 400. The pressurization fluid displaces the working gas in to the Stirling engine 100. The working as is provided to the cylinders 101, 102 of the Stirling engine. The pressurization fluid reduces the volume available for the working gas and therein increases the pressure of the working gas in the Stirling engine 100.

If the pressure of the working gas in the Stirling engine 100 is sufficient then the Stirling engine 100 may begin its work-cycle.

If additional pressure is required to achieve the required starting pressure then the process of pressurizing the Stirling engine 100 is repeated, as is described below.

A valve 401 between the Stirling engine 100 and the accumulator 400 is closed such that working gas cannot flow to the accumulator 400 from the Stirling engine 100. The valve 401 may be a check valve 401 which is always closed to flow from the Stirling engine to the accumulator 400. The pressurization fluid is then discharged from the accumulator 400, reducing the pressure in the accumulator. The pressurization fluid may be discharged to a storage tank. The storage tank is in fluidic communication with the accumulator 400.

A pressurisation fluid discharge 404 valve is opened to discharge the pressurization fluid from the accumulator. Discharging the pressurization fluid from the accumulator 400 reduces the pressure in the accumulator 400. The pressure in the accumulator 400 is reduced such that it is below the pressure of the working gas present in the low pressure receptacle 500. The discharge valve 404 for discharging the pressurization fluid is then closed. A low pressure valve 402 provided between the low pressure receptacle is opened such that working gas may flow in to the accumulator. The low pressure 402 valve may be a check valve 402 such that working gas cannot flow from the accumulator 400 to the low pressure receptacle 500.

As above, pressurization fluid may thereafter be provided to the accumulator 400. Pressurization fluid is provided such that the volume available to the working gas is reduced, thus increasing the pressure of the working gas. The accumulator and the Stirling engine are fluidically connected such that the portion of the Stirling engine comprising working gas and the region of the accumulator comprising working gas form a single volume. The Stirling engine 100 and the accumulator 400 may be connected such that working gas may not flow from the engine 100 to the accumulator 400, but only flow from the accumulator 400 to the engine 100.

To discharge the Stirling engine 100 the working gas discharge valve 403 may be opened to discharge at least a portion of the working gas to the low pressure receptacle 500.

The Stirling engine 100 and the Stirling engine assembly 1 comprising the accumulator 400 and associated valves may be advantageously used in a solar thermal power energy generation system.

In a solar thermal power system the heater 300 is provided with thermal energy from a heat transfer fluid. The heater 300 may be a heat exchanger through which the heat transfer fluid may flow. The heat transfer fluid warms the working gas of the Stirling engine assembly 1. The heat transfer fluid may be a molten salt solution. The heat transfer fluid may be a molten metal, such as molten sodium. Heat transfer fluid may be pumped to the heater 300. The heat transfer fluid may be heated directly by sunlight, and/or it may be heated by thermal energy stored in a phase change material.

Accordingly, the present disclosure relates to a Stirling engine assembly 1 for use in a solar thermal energy plant comprising, a Stirling engine 100, a heater 300 for receiving heat energy from an external heat source and for heating the working gas, and a regenerator 250 for the regeneration of waste heat from the heated working gas, each of the Stirling engine 100, the heater 300 and the regenerator 250 are connected via a continuous fluidic path for the working gas. The Stirling engine 100 comprises: an expansion cylinder 102, a compression cylinder 101, wherein the expansion and compression cylinders 102, 101 are configured in a V-arrangement, the expansion and compression cylinders 102, 101 are connected at their respective upper portions to the continuous fluidic path. The fluidic path comprises, a first connecting member 112 connecting the expansion cylinder 102 to the heater 300, and a second connecting member 113 connecting the regenerator 250 to the compression cylinder 101, wherein the length of the first connecting member 112 is longer than the length of the second connecting member 113.

In a further aspect the second connecting member 113 comprises a region of reduced internal diameter being less than the internal diameter of the first connecting member 112.

In another aspect, A solar thermal power generation system is provided comprising the Stirling engine assembly 1 for the generation of electrical energy from thermal energy.

Although, the present invention has been described above with reference to specific embodiments, it is not intended to be limited to the specific form set forth herein. Rather, the invention is limited only by the accompanying claims.

In the claims, the term "comprises/comprising" does not exclude the presence of other elements or steps. Additionally, although individual features may be included in different claims, these may possibly advantageously be combined, and the inclusion in different claims does not imply that a combination of features is not feasible and/or advantageous. In addition, singular references do not exclude a plurality. The terms "a", "an", "first", "second" etc do not preclude a plurality. Reference signs in the claims are provided merely as a clarifying example and shall not be construed as limiting the scope of the claims in any way.

The invention claimed is:

1. A method for pressurisation of a working gas in a Stirling engine assembly, the Stirling engine assembly comprising:
a Stirling engine comprising an expansion cylinder and a compression cylinder, wherein the expansion and compression cylinders are configured in a V-arrangement; a regenerator; a cooler; a heater; an accumulator, said accumulator being in fluidic connection with the expansion and/or compression cylinders of the Stirling engine; a check valve for preventing flow to the accumulator from the Stirling engine, a working gas discharge valve, and a low pressure receptacle comprising the working gas, wherein said low pressure receptacle is in fluidic connection with the Stirling engine through the working gas discharge valve, the method comprising:
providing the working gas to the accumulator from the low pressure receptacle;
providing a pressurisation fluid to the accumulator to reduce the volume for the working gas in the accumulator, thereby increasing the pressure of the working gas in the accumulator;

displacing the pressurised working gas from the accumulator to the expansion and/or compression cylinder; and at discharge, opening the working gas discharge valve to discharge at least a portion of the working gas to the low pressure receptacle.

2. The method according to claim 1, further comprising discharging the pressurisation fluid from the accumulator such that a new volume of working gas may flow to the accumulator.

3. The method according to claim 1, wherein the process of providing the working gas, providing the pressurisation fluid, and displacing the pressurised working gas is repeated a plurality of times.

4. The method according to claim 1, wherein the accumulator is provided with a displaceable diaphragm or piston for separating the pressurisation fluid from the working gas.

5. The method according to claim 1, wherein the pressurisation fluid and the working gas are immiscible.

6. The method according to claim 1, wherein the pressure of working gas in the low pressure receptacle is greater than about 15 bar.

7. The method according to claim 1, wherein working gas is prevented from flowing from the Stirling engine to the accumulator.

8. The method according to claim 1, wherein the Stirling engine assembly is for use in a solar thermal energy plant.

9. A Stirling engine assembly comprising:

a Stirling engine comprising an expansion cylinder and a compression cylinder, wherein the expansion and compression cylinders are configured in a V-arrangement;

a regenerator;

a cooler;

a heater;

an accumulator, the accumulator configured with a pressurization fluid for displacing the working gas in to the Stirling engine, wherein said accumulator is in fluidic connection with the expansion and/or compression cylinders of the Stirling engine; and a low pressure receptacle comprising the working gas, said low pressure receptacle being in fluidic connection with the Stirling engine and the accumulator, wherein the Stirling engine assembly is configured such that working gas is prevented from flowing from the Stirling engine to the accumulator.

10. The method according to claim 1, wherein the pressure of working gas in the low pressure receptacle is 35 bar.

11. The method according to claim 2, wherein the process of providing the working gas, providing the pressurisation fluid, and displacing the pressurised working gas is repeated a plurality of times.

12. The method according to claim 2, wherein the accumulator is provided with a displaceable diaphragm or piston for separating the pressurisation fluid from the working gas.

13. The Stirling engine assembly according to claim 9, further comprising a first check valve between the accumulator and the Sterling engine, the first check preventing the working gas from flowing from the Stirling engine to the accumulator.

14. The Stirling engine assembly according to claim 13, further comprising a second check valve between the accumulator and low pressure receptacle, the second check preventing the working gas from flowing from the accumulator to the low pressure receptacle.

15. The Stirling engine assembly according to claim 9, further comprising a second check valve between the accumulator and low pressure receptacle, the second check preventing the working gas from flowing from the accumulator to the low pressure receptacle.

16. The Stirling engine assembly according to claim 9, further comprising a first connector extending between the expansion cylinder and regenerator, heater and cooler and a second connector extending between the compression cylinder and the regenerator, heater and cooler wherein the first connector is longer than the second connector.

17. The Stirling engine assembly according to claim 16, wherein the regenerator is between the heater and cooler.

18. The Stirling engine assembly according to claim 9, wherein the regenerator is between the heater and cooler.

19. The method according to claim 1, further comprising preventing the working gas from flowing from the accumulator to the low pressure receptacle.

* * * * *